United States Patent [19]
Allsworth

[11] Patent Number: 4,632,505

[45] Date of Patent: Dec. 30, 1986

[54] OPTICAL FIBER CONNECTOR

[75] Inventor: Terrence W. Allsworth, Manhattan Beach, Calif.

[73] Assignee: The Deustsch Company Electronic Components Division, Los Angeles, Calif.

[21] Appl. No.: 603,560

[22] Filed: Apr. 25, 1984

Related U.S. Application Data

[63] Continuation-in-part of Ser. No. 540,793, Oct. 11, 1983, abandoned.

[51] Int. Cl.⁴ .................................................. G02B 6/38
[52] U.S. Cl. ............................... 350/96.21; 350/96.18
[58] Field of Search ............... 350/96.18, 96.20, 96.21, 350/96.22, 320

[56] References Cited

U.S. PATENT DOCUMENTS

| | | | |
|---|---|---|---|
| 3,724,383 | 4/1973 | Gallaghan et al. | 102/70.2 A |
| 3,727,172 | 4/1973 | Clark | 339/59 M |
| 4,008,948 | 2/1977 | Dalgleish et al. | 350/96.21 |
| 4,135,781 | 1/1979 | Archer | 350/96.20 |
| 4,140,366 | 2/1979 | Makuch et al. | 350/96.22 |
| 4,265,511 | 5/1981 | Nicia et al. | 350/96.18 |
| 4,296,999 | 10/1981 | Mead | 350/96.21 |
| 4,304,461 | 12/1981 | Stewart et al. | 350/96.18 |
| 4,383,732 | 5/1983 | Dalgoutte et al. | 350/96.20 |

FOREIGN PATENT DOCUMENTS

| | | | |
|---|---|---|---|
| 2703887 | 1/1977 | Fed. Rep. of Germany . | |
| 3012118 | 10/1981 | Fed. Rep. of Germany ... | 350/96.20 |
| 2334969 | 12/1975 | France . | |
| 56-06209 | 1/1981 | Japan | 350/96.20 |
| 56-52713 | 5/1981 | Japan | 350/96.20 |
| 7605819 | 12/1977 | Netherlands . | |
| 1257359 | 5/1969 | United Kingdom . | |
| 1429843 | 6/1973 | United Kingdom . | |
| 1445323 | 3/1975 | United Kingdom . | |
| 2097149 | 10/1982 | United Kingdom | 350/96.18 |

Primary Examiner—John Lee
Attorney, Agent, or Firm—Gausewitz, Carr & Rothenberg

[57] ABSTRACT

This invention provides an optical fiber connector having fiber termination assemblies each of which includes a member with a rearward barrel which is crimped over the optical fiber for retaining the fiber, and an external annular ridge defining shoulders used in holding the unit in the connector body, such as by retention fingers. Also included is a forward tubular part in which is a spherical lens centered in a recess, and an axial opening through which the fiber extends to a position adjacent the lens. A shoulder or transparent member may space the fiber end a predetermined distance from the spherical lens. The tubular part of one of the termination units may have an enlarged forward end receiving the forward end of the other for aligning the two and positioning the spherical lenses in spaced adjacency when the connector is mated.

15 Claims, 11 Drawing Figures

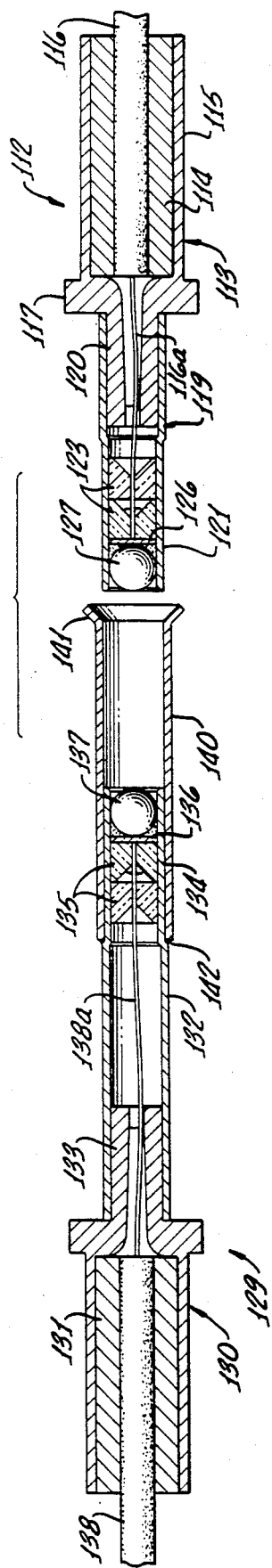
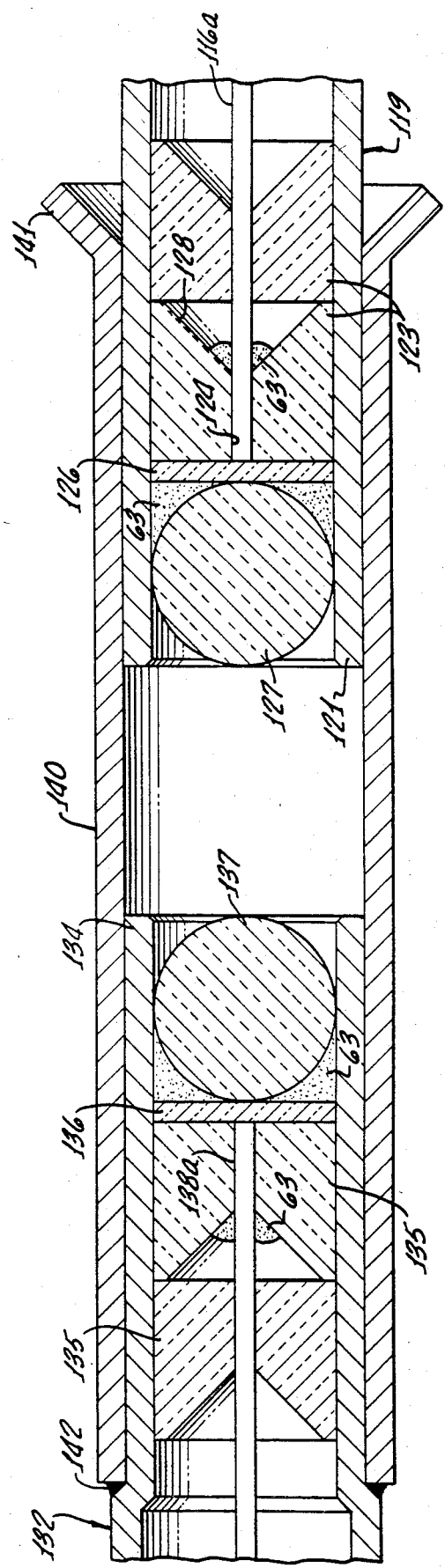
Fig. 8.
Fig. 9.

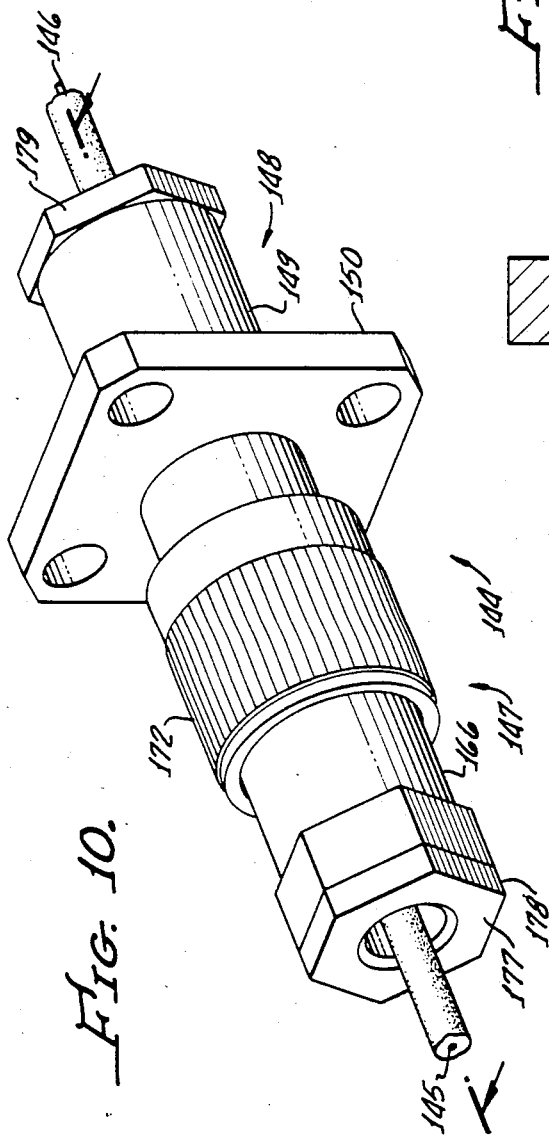
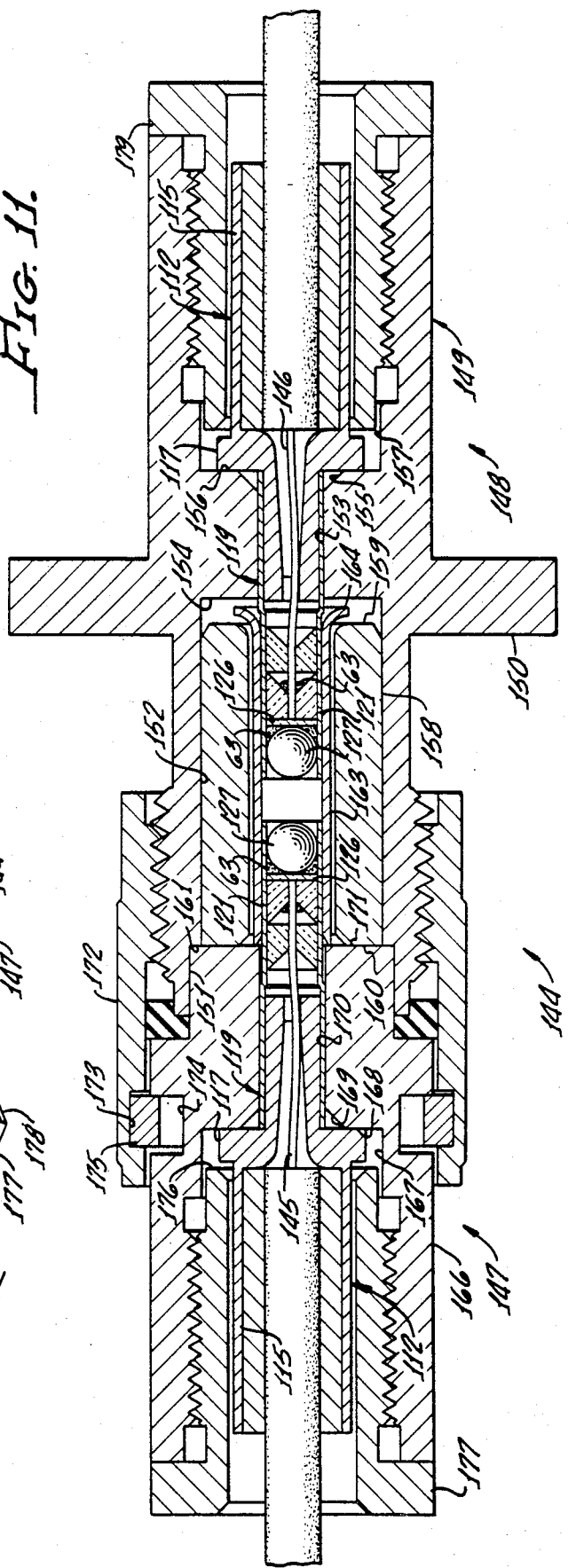

OPTICAL FIBER CONNECTOR

CROSS-REFERENCE TO RELATED APPLICATION

This application is a continuation-in-part of co-pending U.S. patent application Ser. No. 540,793, filed Oct. 11, 1983, for Optical Fiber Connector (now abandoned), the disclosure of which is incorporated herein by this reference as though fully set forth.

BACKGROUND OF THE INVENTION

Many optical fiber connectors can achieve efficiency of coupling only through complex designs requiring meticulous adjustments. As such, they are more suitable for laboratory experiments than for field use. Production costs are very high. Other optical fiber connectors lack convenience of use and may not allow for removal and replacement of the optical fibers. There has been a need in the past for an efficient optical fiber connector which will interconnect a number of optical fibers and function in a way very similar in which an electrical connector joins a multiplicity of electrical conductors.

BRIEF DESCRIPTION OF THE INVENTION

The present invention provides an optical fiber connector that can be used to connect fibers much as an electrical connector is used in connecting wires. The optical fibers are removably retained within the connector which may be coupled together with a quick disconnect mechanism, and effectively sealed against the environment.

In the connector of this invention, light is transmitted from one fiber to the other through spherical lenses. The latter elements are held within termination assemblies that have rearward crimping barrels which are crimped about the protective covering of the optical fibers to secure the fibers in place. Annular ridges provide shoulders permitting the termination assemblies to be held in the inserts through retention fingers for rear insertion and release. Tubular forward projections of the termination assemblies include recesses for retaining and aligning the spherical lenses. These recesses may be formed in synthetic rubies, such as used in the manufacture of clock and watch jewels, which may be formed to great precision. The spherical lens is held to the seat by optical cement, as well as by a bending of the material of the tubular projection around the forward edge of the sphere. The optical fiber is inserted through a complementary opening at the axis of the lens support to position its end adjacent the rearward face of the lens.

In another embodiment of the invention, the spherical lens is received in the forward end of the tubular member with a press fit, the rearward end of the sphere engaging a disc of transparent material within the tubular member. On the rearward side of the disc is a guide member, which may be of synthetic ruby, likewise positioned in the tubular member by a press fit. An opening at the axis of the guide member receives the end of the optical fiber which is pressed against the disc and accurately aligned with the center of the spherical lens. An optical fluid wets the end of the fiber and also occupies the space around the rearward part of the spherical lens adjacent the disc.

The disc acts as a spacer to position the fiber end a predetermined distance from the spherical lens. The end of the fiber also may be spaced from the lens by a stop surface in a member which provides also the seat for the spherical lens and the guide for the fiber end. This spacing allows the spherical lenses to have a relatively low index of refraction, as a result of which they can be produced economically from standard materials, while permitting considerable separation of the lenses. A wide range of lens separation distances is permissible when the fiber ends are spaced from the lenses, which allows the connector design to be simplified for maximum reliability and minimum cost. Alternatively, the fiber ends can abut the spherical lenses, even if the latter are of relatively high index of refraction, if the lenses are of small diameter relative to the core diameter of the fibers. When this is done, the spherical lenses must be very close to each other so as to be almost but not quite in contact with each other. This adds significantly to the cost of manufacture of the connector. It also precludes positioning multiplexing or splitting substrates between the lenses.

The tubular forward projection of one of the optical termination assemblies has an extension of enlarged diameter that complementarily receives the forward portion of the mating termination assembly. The mating of the two termination assemblies aligns the spheres and optical fibers along a common axis, positioning the spherical lenses in spaced adjacency. An efficient coupling results.

In one version of the invention, the extension of enlarged diameter is replaced by a sleeve held captive in the body of the connector. The two tubular forward projections, carrying the spherical lenses, enter the captive sleeve from opposite ends when the connector is mated, which accurately aligns the lenses and fibers.

The resulting connector is readily manufactured, and easily mounted and used in aircraft, aerospace and other installations, much in the same way as the electrical connectors of electrical circuits previously used. The arrangement of this invention allows a connector to be made in which the optical fiber termination assemblies are interchangeable with electrical contacts. This will permit the connector to accommodate both electrical conductors and optical fibers at the same time, or to be converted from one to the other.

BRIEF DESCRIPTION OF THE DRAWINGS

FIG. 8 is a longitudinal sectional view of separated optical fiber termination assemblies of a different embodiment of the invention;

FIG. 9 is an enlarged fragmentary longitudinal sectional view of the forward portions of the termination assemblies of FIG. 8 in the mated condition;

FIG. 10 is a perspective view of the connector constructed to interconnect only two optical fibers; and FIG. 11 is an enlarged longitudinal sectional view of the connector of FIG. 10.

DETAILED DESCRIPTION OF THE INVENTION

Figure 1:
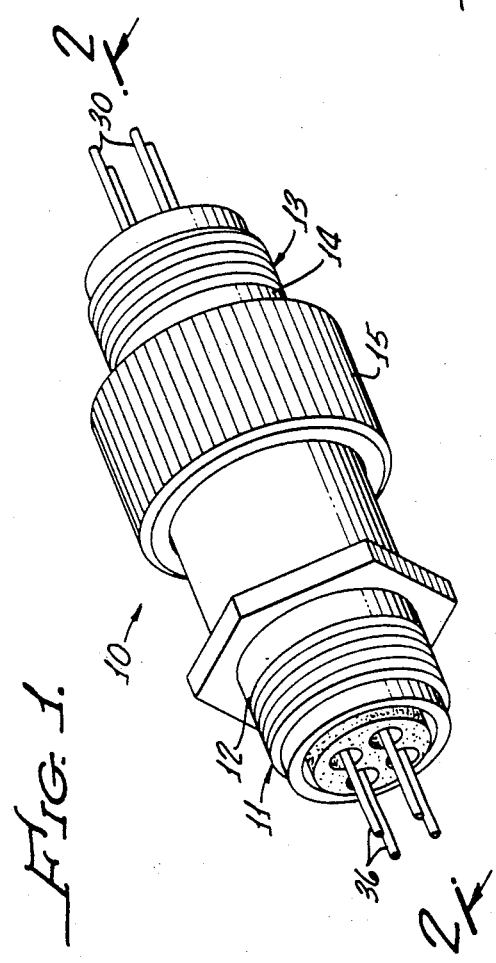
FIG. 1 is a perspective view of an optical fiber connector constructed in accordance with the present invention.
Figure 2:
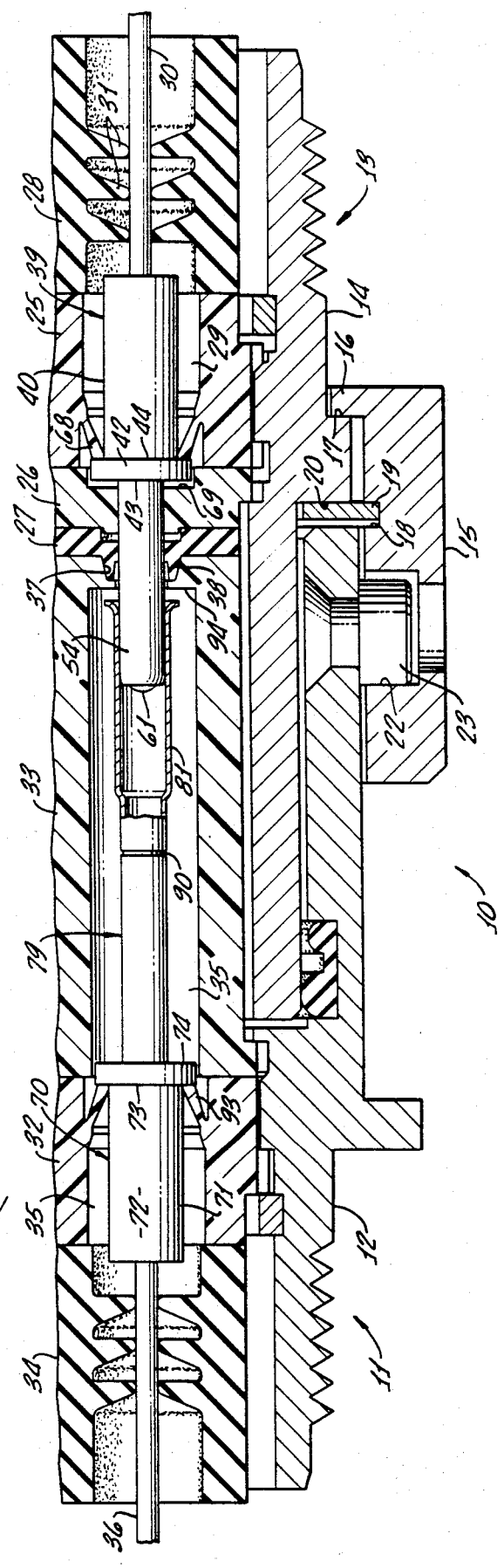
FIG. 2 is an enlarged longitudinal sectional view taken along line 2—2 of FIG. 1.
Figure 3:
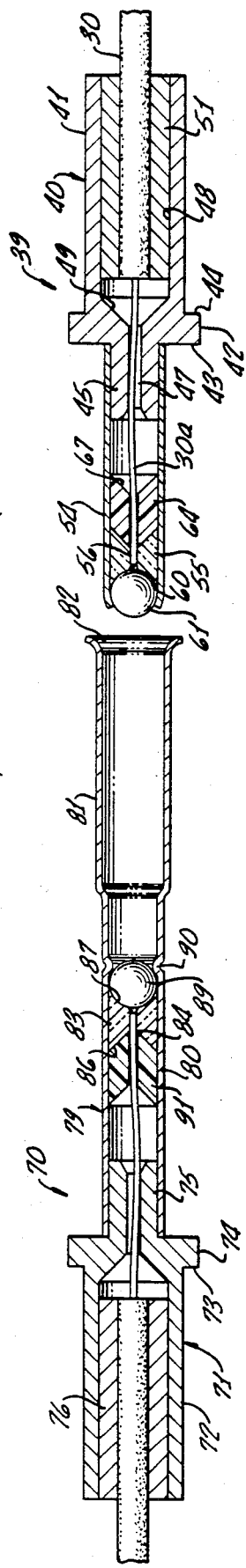
FIG. 3 is a longitudinal sectional view of the optical fiber termination assemblies in the separated condition, removed from the other components of the connector.

The connector 10, made in accordance with the present invention, includes a receptacle 11 having a shell 12 and a plug 13 that includes a plug shell 14 circumscribed by a coupling ring 15. The latter element may be part of a suitable coupling mechanism, such as any kind conventionally used in electrical connectors. In the example shown, the coupling ring 15 includes an inwardly directed flange 16 at its rearward end which fits behind a rearwardly facing shoulder 17 on the exterior of the plug shell 14. A recess 18 in the inner circumferential wall of the coupling ring receives a split resilient ring 19 in front of a forwardly facing shoulder 20 on the plug shell 14 so that the coupling ring is held axially on the plug shell. A bayonet groove 22 in the forward part of the circumferential inner wall of the coupling ring 15 receives a bayonet pin 23 carried by the receptacle shell 12 when the connector is in the mated position of FIG. 2, which holds the plug and receptacle together. The foregoing components may correspond to those disclosed in U.S. Pat. No. 3,727,172.

Within the plug shell 14 is a rigid plastic insert disc 25, on the forward end of which is mounted a thinner plastic insert disc 26. On the forward side of the latter element is a gasket disc 27, which may be of an elastomer such as silicone rubber. An additional and longer insert 28 of resilient material such as silicone rubber is bonded in the rearward end of the plug shell 14 and to the rearward face of the insert 25. Collectively, the inserts 25, 26, 27 and 28 define an opening 29 through the plug 13 between its forward and rearward ends for each of the optical fibers to be connected. Ribs 31 in the opening 29 at the rearward elastomeric insert 28 seal around the fiber cable 30 as it enters the plug. In the connector, as shown, four optical fibers enter each of the mating connector sections, although in practice a greater number may be accommodated.

Secured within the receptacle shell 12 is an insert 32 of rigid plastic material on the forward end of which is bonded a longer insert 33 of similar material. An additional insert 34, bonded to the rearward face of the insert 32, is of resilient elastomeric material, such as silicone rubber. The inserts 32, 33 and 34 of the receptacle collectively define an opening 35 for each of the optical fiber cables 36 that enter the receptacle. At the forward end of the opening 35 in the insert 33 is an inwardly tapered counterbore 37 that receives a frustoconical projection 38 on the forward face of the insert 27 when the connector is in the mated position. This provides an effective moisture seal around each of the openings at the mating surfaces.

Within the opening 29 in the plug 13 is a fiber termination assembly 39. This unit includes a tubular body 40 having a rearward crimping barrel 41, an intermediate annular enlargement 42 defining forward and rearward shoulders 43 and 44, respectively, and a relatively short forwardly projecting end 45 of smaller diameter. The bore through the member 40 includes a forward portion 47 of relatively small diameter, a larger portion 48 in the barrel end 41, and a forwardly tapering portion 49 joining the bore sections 47 and 48.

Within the rearward end of the member 40 is a crimping sleeve 51 complementary on its exterior surface to the wall of the bore 48. In the assembled connector, the optical fiber 30, including its outer protective cable, fits within the sleeve 51, with the bare fiber 30a extending beyond the sleeve through the bore 47. The barrel 41 is crimped inwardly causing the sleeve 51 to grip the cable of the fiber 30 and hold the optical fiber within the termination assembly 39.

Figure 5:
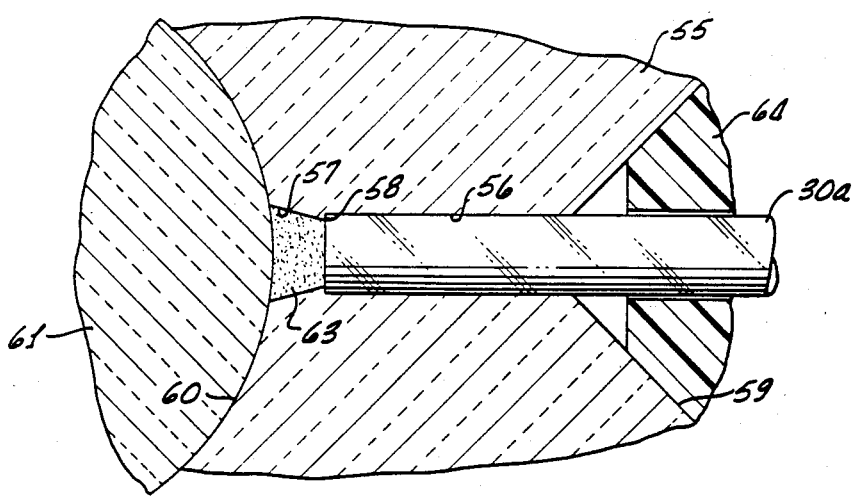
FIG. 5 is an enlarged fragmentary longitudinal sectional view illustrating the relationship of the fiber end and the spherical lens.

The rearward portion of a tubular member 54 complementarily receives the forward end part 45 of the member 40, with its end edge abutting the forward shoulder 43 of that member. Within the tubular member 54, adjacent its forward end, is a fiber guide member 55 held to the inner wall of the tubular member 54 such as by a shrink fit. The member 55 may be of a material commonly used for watch jewels, such as synthetic ruby material which can be readily formed to considerable accuracy. Extending inwardly from the rearward end of the member 55 at its axis is an opening 56 complementary to the fiber 30a. A short frustoconical extension 57 of this opening is at the forward end of the member 55. The inner end of the latter opening is smaller than the opening 56 so as to provide a narrow annular shoulder 58 between them (see FIG. 5).

At the rearward end of the member 55 is an inwardly tapered surface 59 leading to the opening 56. The forward end of the member 55 is provided with a recess 60 that is semispherical, or slightly less than a semisphere. A projection of the axis of the opening 56 intersects the center of curvature of the recess 60. Within the recess 60 is a sphere 61 of transparent material, preferably glass of a predetermined index of refraction, which may be as low as 1.5. The sphere 61 complementarily engages the surface of the recess 60 of the member 55 where it is held by optical cement, such as epoxy resin. In addition, the forward end portion 62 of the tubular member 54 is bent inwardly around the forward side of the sphere 61 to assist in retaining it. Because of the taper of the recess surface 60, the sphere 61, by engaging this surface, becomes accurately centered with respect to the opening 56 in the member 55. This, in turn, centers the sphere 61 relative to the optical fiber 30a which extends into the opening 56. The outer peripheral portion of the end of the optical fiber 30a butts against the shoulder 58, which positions the fiber end close to the surface of the sphere 61. The spacing between the fiber end and the surface of the sphere may be calculated as a function of the index of refraction and the diameter of the sphere. An optical index fluid 63 occupies the opening 57 between the end of the fiber 30a and the sphere 61. The narrow shoulder 58 does not obstruct the core of the fiber 30a. In this arrangement, therefore, the sphere 61 acts as a spherical lens for light transmitted through the fiber 30.

To assist in aligning the fiber 30a with the sphere 61 and avoiding angularity such that an extension of the axis of the fiber 30a would not substantially intersect the center of the sphere, there may be provided an additional plastic sleeve 64 in the tubular member 54 rearwardly of the member 55. The sleeve 64 includes a bore 65 through which the fiber 30a passes, providing additional guidance for the fiber for accurate alignment with the sphere 61. The forward end 66 of the sleeve 64 is tapered to complementarily engage rearward end 59 of the member 55. The rearward end surface 67 of the sleeve 64 is inwardly tapered to help direct the optical fiber into the bore 65.

The open space in the tubular member 54 rearwardly of the sleeve 64, if it is used, and of the member 55, if it is not, as well as the opening 47 in the member 40 and part of the opening 48 in that member, act as an accumulation chamber to accommodate the excess length of the fiber 30a as it is pressed against the shoulder 58. The projecting end 30a of the fiber beyond the outer covering is given a slight excess in length to assure that the fiber end is firmly pressed against the shoulder 58, and this is readily accommodated in the accumulation chamber.

The optical termination assembly 39 is held in the plug 13 by means of retention fingers 68 that incline inwardly toward the axis of the opening 29 and forwardly from the circumferential wall of the opening through the insert disc 25. The fingers 68 may be similar to those shown in U.S. Pat. No. 3,727,172, being four in number and collectively having a generally frustoconical shape. The forward ends of the fingers fit behind the annular enlargement 42 at the rearward shoulder 44 of the member 40, thereby holding this member against rearward movement. On the forward side of the annular enlargement 42, the shoulder 43 is positioned adjacent the rearwardly facing radial surface 69 of the insert disc 26 at a counterbore in the opening 29, which positions the assembly 39 against forward movement. Thus, the optical fiber termination assembly 39 is held in the plug of the optical connector in exactly the same way that an electrical contact is held in an electrical connector of the rear-release type. In fact, the same insertion and removal tool employed for electrical contacts can be utilized in inserting and removing the optical fiber termination assembly 39. Also, the tool for crimping the barrel 41 and sleeve 51 may be the same as that for crimping electrical contacts so as to grip wires in an electrical connector.

A second optical fiber termination assembly 70 fits within the opening 35 of the receptacle 11. Included with the assembly 70 is a member 71 which is identical to the member 40 of the assembly 39. Thus, it includes a rearward crimp barrel 72, a rearwardly facing shoulder 73 at an annular enlargement 74, and a short forward end part 75. Within the rearward crimp barrel 72 of the member 71 is a sleeve 76 which receives the optical fiber 36 and is crimped inwardly to retain it around the fiber.

A sleeve 79 fits over the forward part 75 of the member 71 projecting forwardly from it. The rearward part 80 on the sleeve 79 is of smaller diameter than the forward end 81 of the sleeve. An outwardly flared entrance 82 leads to the forward end part 81.

Within the rearward portion 80 of the sleeve 79, which is substantially of the same inside diameter as the outside diameter of the tubular member 54 of the assembly 39, is a synthetic ruby 83 identical to the member 55. Thus, it includes an axial bore 84 leading to a tapered forward opening 85, a rearward frustoconical surface 86, and a forward semispherical recess 87. A shoulder 88 connects the bore 84 to the forward opening 85. A glass sphere 89, identical to the sphere 61, is received in the rearward portion 80 of the sleeve 79, complementarily bearing against and centered by the wall of the recess 87 of the member 83. There it is held by an optical cement, as well as by an annular bead 90 deflected inwardly from the wall of the sleeve 79. The end of the optical fiber 36 is butted against the shoulder 88, with a small quantity of an optical index fluid beween the fiber end and the sphere 89. The optical fiber 36 is aligned with the axis of the sphere 89 by means of the accurately formed opening 84 in the member 83.

If desired, an additional plastic aligning member 91 may be positioned within the rearward portion 80 of the sleeve 79, immediately behind the member 83 to receive the optical fiber 36 at its axial opening 92. The member 91 corresponds to and is the same as the member 64 of the other optical termination assembly.

The optical termination assembly 70 is held within the receptacle 11 by means of forwardly and inwardly inclined resilient fingers 93 that project from the wall of the receptacle insert 32. The retention fingers 93 correspond to the fingers 68 in the plug 13 and are positioned around the crimp barrel 72 in back of the rearward shoulder 73. Thus, the optical termination assembly 70 is retained agaist rearward movement in the receptacle in the same manner that the termination assembly 39 is held in the plug 13. The forward end of the sleeve 79 is located adjacent a radial shoulder 94 adjacent the forward end of the insert disc 33, which holds the optical termination assembly 70 against forward movement. Again, the retention is the same as that for an electrical contact in an electrical connector.

Figure 4:
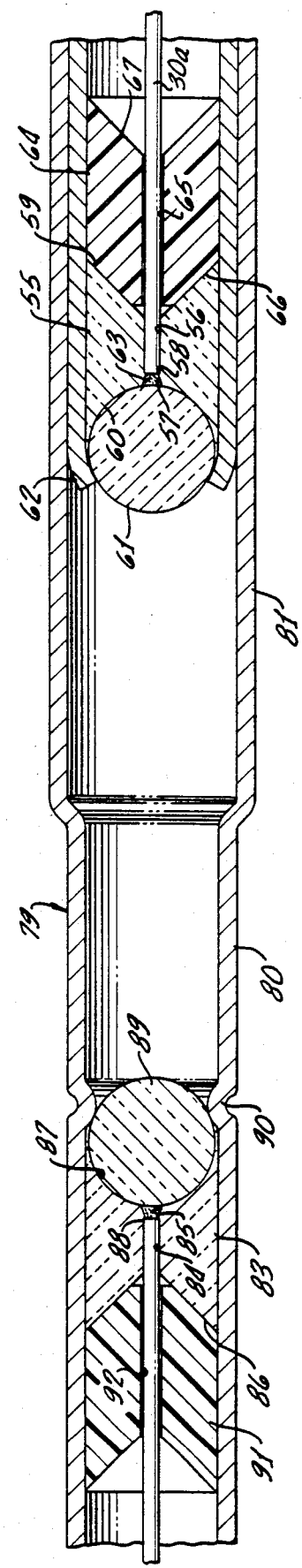
FIG. 4 is an enlarged fragmentary longitudinal sectional view of the forward portions of the termination assemblies in the mated condition.

When the connector is mated through the connection of the plug 13 and the receptacle 11, the termination assemblies 39 and 70 are advanced toward each other, which causes the forward part of the tubular member 54 of the assembly 39 to enter the forward end 81 of the sleeve 79 of the assembly 70. The forward portion 81 of the sleeve 70 is dimensioned to complementarily receive the tubular member 54, which causes the two termination assemblies to become axially aligned. In the fully mated position, shown in FIG. 4, the spherical lens 61 is positioned adjacent and directly opposite from the spherical lens 89. The sleeve 79 and tubular member 54, together with the members 55 and 83, cause the spherical lenses 61 and 89, and the optical fibers 30a and 36, to become accurately aligned along a common axis. The result is a very efficient optical connector, as light from one of the optical fibers will be transmitted into the adjacent spherical lens through the center of the connector to the other spherical lens, and from that spherical lens into the other optical fiber. The components provide very precise alignment of the fibers and the spherical lenses to produce an efficient optical connection. At the same time, the connector is easily and economically made through the use of techniques known in the construction of electrical connectors, and can be installed and handled as electrical connectors normally are used. The fibers are not permanently installed in the plug and receptacle, and instead can be removed and replaced as desired by virtue of the optical termination assemblies and their manner of retention in the connector. The fiber ends always are protected when received in the optical termination assemblies. The danger of contamination is minimal.

Figure 6:
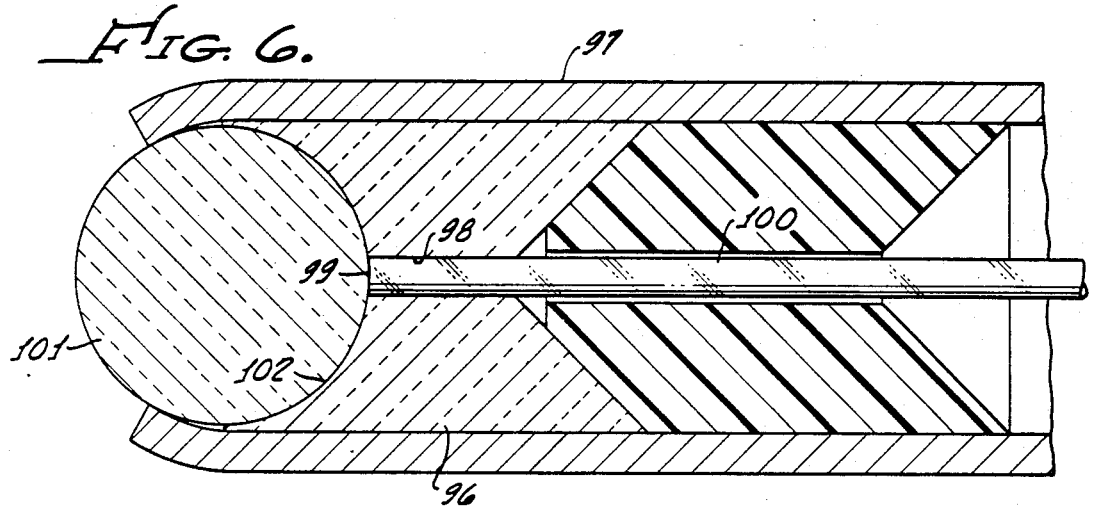
FIG. 6 is a fragmentary longitudinal sectional view of a modified optical fiber termination unit.

In some instances, when the spherical lenses have a higher index of refraction, the optical fiber may be butted directly against the lens instead of being spaced from it. An example is seen in FIG. 6 where a sapphire 96 within a sleeve 97 of an optical termination assembly has a bore 98 of uniform diameter throughout its length. This allows the end 99 of the optical fiber 100 to extend all the way to the spherical lens 101 in the recess 102. The diameter of the spherical lens will be a function of the core diameter of the fiber and of the index of refraction of the lens material. Typically, the lens diameter is within the range of six to twelve times the core diameter when the lens has an index of refraction of 1.76. A small quantity of an optical matching fluid will be interposed between the fiber end and the lens. Connectors of this embodiment must provide for spherical lens-to-lens locations almost abutting, but providing enough separation to prevent damage to the lens surfaces or any coatings on the lens surfaces. This requirement may be achieved by rigorous control of manufacturing tolerances. Alternatively, a mechanism may be provided to accomplish the spacing, such as a spring arrangement in the connector body or in one of the optical termination assemblies by which a spring-loaded element of one optical termination assembly is forced against a suitable stop in the other optical termination assembly. This will allow one spherical lens to be advanced only a predetermined limited distance relative to the other. The spherical lens-to-lens separation in the other embodiments of this invention is not critical and may be from one half to three times the diameter of the lens and still provide a practical optical connector.

Figure 7:
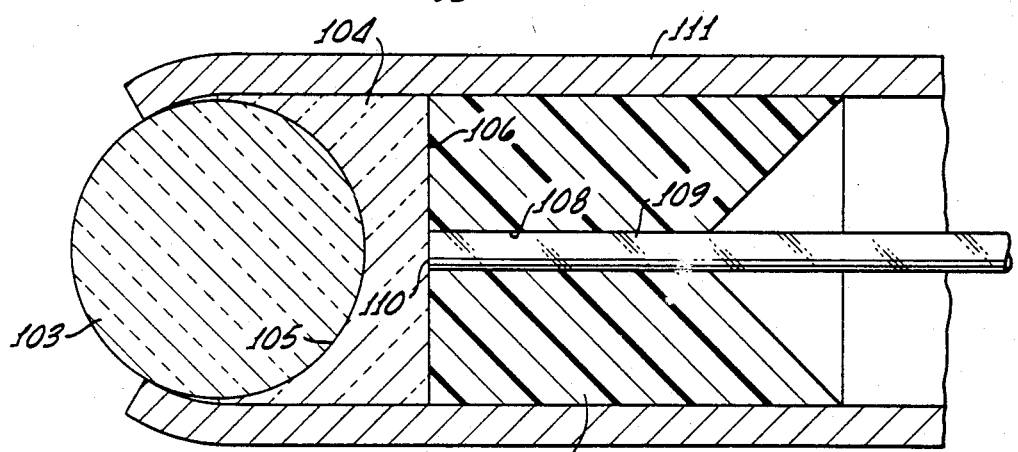
FIG. 7 is a fragmentary longitudinal sectional view of another embodiment of the optical fiber termination unit.

In the embodiment of FIG. 7, the spherical lens 103 is seated in a transparent glass member 104 of predetermined index of refraction, which has a recess 105 to complementarily receive the lens. At the flat radial rearward end 106 of the member 104 is a plastic guide 107 for the optical fiber 109. The fiber extends complementarily into a cylindrical opening 108 at the axis of the guide 107 so that the fiber end 110 abuts the rearward end 106 of the member 104. The fiber end 110 may be wetted with an optical fluid before being pressed into engagement with the member 104. The spherical lens 103, glass member 104 and guide 107 are received in a sleeve 111, which may correspond either to the sleeve 54 or the sleeve 79 of the embodiment of FIGS. 1-5. In this design, the fiber end is spaced a predetermined distance from the spherical lens 103, with which it is accurately aligned. Light is transmitted efficiently between the fiber and the lens through the glass member 104. The spherical lens 103 should touch the glass member 104 at the center portion of the recess 105 opposite from the optical fiber end 110.

Instead of being substantially semispherical, the recesses for the spherical lenses may be frustoconical or otherwise shaped. This will align the lens with the fibers as does the semipherical recess. The spherical lenses may be given an optical antireflective coating to combat Fresnel losses.

The embodiment of FIGS. 8 and 9 is advantageous for its ease of manufacture, as well as for the efficient optical coupling it obtains. The fiber termination assembly 112 of this version of the invention includes a tubular body 113 similar to the body 40 in the previously described embodiment. A crimping sleeve 114 fits within the rearward crimping barrel 115 of the body 113 for gripping the protective cable 116 of the optical fiber 116a. As before, the body 113 includes an annular ridge 117 for engagement by a retention mechanism used in holding the unit in a connector body.

A tubular member 119 fits on the forwardly projecting end 120 of the tubular body 113, beyond which the tubular member 119 has a forward end portion 121 of slightly reduced diameter. Within the latter portion are two guide members 123 in an end-to-end abutting relationship. The guide members 123 have cylindrical exterior surfaces and are received within the forward portion 121 of the tubular member 119 with a press fit. This frictionally retains the guide members 123 axially within the tubular member 119. The members 123 include cylindrical openings 124 at their axes for complementarily receiving the optical fiber 116a. For extreme precision, the members 123 preferably are made of synthetic ruby.

Engaging the forward end of the forward one of the two guide members 123 is a transparent disc 126 having parallel front and rearward end surfaces, a predetermined thickness, and predetermined index of refraction. The periphery of the disc 126 is generally complementary to the forward portion 121 of the tubular member 119, but the disc need not fit tightly.

On the forward end of the disc 126 is a spherical lens 127 similar to the spherical lenses in the previously described embodiments of the invention. The sphere 127 is received at the forward end of the portion 121 of the tubular member 119 with a press fit. Therefore, friction retains the spherical lens 127 in its axial position within the tubular member, abutting the forwardly facing end of the disc 126. A quantity of optical fluid 63 occupies the space between the rearward side of the sphere 127 and the disc 126. An additional amount of the optical fluid 63 is included in the conical rearward entrance 128 to the opening 124 in the forward one of the guide members 123.

By this arrangement, the components are assembled very readily by first pressing the guide members 123 inwardly from the rearward end of the tubular member 119, locating them at predetermined axial positions. Then the disc 126 is dropped into the forward end portion 121 of the tubular member 119. After this, the spherical lens 127 is pressed rearwardly into the forward end of the tubular member 119 to the point of engagement with the disc 126. Thus, the forward end of the portion 121 and the disc 126 define a recess comparable to the recesses for the spherical lenses in the previously described embodiments. The forward end of the disc 126 acts as an abutment surface engaged by the lens 127, when the lens is fully inserted into the forward end portion 121 of the member 119.

When the connector is assembled, the forward end of the fiber 116a passes through the openings 124 in the guide members 123, becoming wetted by the optical fluid 63 in the entrance 128. The fiber end then is firmly pressed against the rearwardly facing end surface of the disc 126. This guides the fiber 116a to a position of precise alignment with the center of the spherical lens 127, with the fiber end spaced a predetermined distance from the lens.

The other optical fiber termination assembly 129 includes a tubular body 130 and crimping sleeve 131, which may be identical to the tubular body 113 and crimping sleeve 114. A tubular member 132 fits on the forwardly projecting end 133 of the tubular body 130. The tubular member 132 is made slightly longer than the tubular member 119. Within the forward reduced diameter portion 134 of the tubular member 132, which is of the same diameter as the forward end 121 of the member 119, are two guide members 135 and a disc 136. The latter may be identical to the guide members 123 and the disc 126, and are assembled in the same manner. A spherical lens 137 is received in the end of the forward portion 134 of the tubular member 132 with a press fit just as the lens 127 in the forward portion 121. The end of the optical fiber 138a, beyond the fiber cable 138, abuts the rearward face of the disc 136 in alignment with the spherical lens 137.

Circumscribing the forward end portion 134 of the tubular member 132, and projecting forwardly beyond it, is an addition tube 140 having an outwardly flared forward end 141. The tube 140 fits complementarily around the forward end 134 of the tubular member 132 and is bonded to the member 132 by an adhesive 142 at the rearward end of the tube 140.

When the connector is mated, as seen in FIG. 9, the forward end portion 121 of the tubular member 119 fits complementarily within the forward part of the tube 140. This positions the spheres 127 and 137 opposite from each other a predetermined distance, precisely aligning the two units so that the end parts of the otical fibers 116a and 138a, as well as the centers of the spheres 127 and 137, fall along a common axis, which is the optical axis of the connector.

The connector 144 of FIGS. 10 and 11 is for coupling only two fibers 145 and 146, rather than several pairs of fibers, as in the embodiment of FIGS. 1-4. The connector 144 includes two connector bodies, which are a plug 147 and a receptacle 148. The latter element includes a hollow shell 149 having a flange 150 for attachment to a supporting structure. Interiorly, the receptacle shell has a relatively wide entrance bore 151 at its forward end, inwardly of which is a longer and slightly narrower bore 152. At the intermediate portion of the receptacle shell 149 is a relatively short cylindrical surface 153 of smaller diameter, connecting through a radial shoulder 154 to the inner end of the surface 152. A beveled edge 155 and an additional radial shoulder 156 connect the intermediate bore surface 153 with a larger diameter interior surface 157 rearwardly of the flange 150. The rearward end portion of the receptacle shell 149 is internally threaded.

Received within the bore 152 with a press fit is an insert sleeve 158. The rearward end 159 of the sleeve 158 is spaced a short distance from the shoulder 154. The forward end 160 of the sleeve 158 is aligned with the radial shoulder 161 between the bore surfaces 151 and 152.

A tubular member 163 is received within the bore of the sleeve 158, with an outwardly flared end 164 in the space between the shoulder 154 of the receptacle shell 149 and the end 159 of the sleeve 158. The abutments formed by the shoulder 154 and the sleeve end 158 capture the tubular member 163 so that it is retained in the receptacle 148.

The plug 147 includes a plug shell 166 which is internally threaded at its rearward end. It includes an internal bore 167 of relatively large diameter next to the threaded portion, which connects through a radial shoulder 168 and beveled edge 169 to an internal surface 170 of smaller diameter that extends to the forward end 171 of the plug shell 166. Circumscribing the forward end portion of the plug shell 166 is a coupling ring 172 which has an internal annular groove 173 at its rearward end. Received within the groove 173, as well as in a groove 174 in the exterior of the plug shell 166, is a retaining ring 175 which holds the coupling ring 172 to the plug shell. Internal threads on the forward end of the coupling ring 172 mesh with the external threads on the forward end portion of the receptacle shell 149, thereby holding the plug and receptacle together. In this position, as shown in FIG. 11, the forward end 171 of the plug shell 166 bears against the shoulder 161 of the receptacle shell 149 and the forward end 160 of the insert sleeve 158.

Each of the plug 147 and receptacle 148 carries an optical fiber termination assembly 112. In the plug 147, the annular ridge 117 of the fiber termination unit is positioned between the shoulder 168 and the inner end 176 of a nut 177. A flange 178 on the nut 177, which may have a hexagonal contour, engages the rearward end of the plug shell 166. The forward end portion 121 of the fiber termination unit 112 then projects beyond the forward end 171 of the plug shell 166 and slides into the tubular member 163.

In the receptacle 148, the annular ridge 117 of the fiber termination assembly 112 is located between the shoulder 156 and the inner end of a nut 179 which is similar to the nut 177. The forward portion of the fiber termination assembly extends through the bore 153, with the end part 121 projecting beyond the shoulder 154 and into the opposite end of the tubular member 163. Thus, the spherical lenses 127 of the two fiber termination assemblies are positioned oppositely from each other, spaced a predetermined distance. The tubular member 163, closely receiving the forward end portions 121 of the two fiber termination assemblies, accurately aligns these elements so that the optical fibers 145 and 146, and the spherical lenses all fall along a common axis. Efficient optical coupling is the result.

In this version of the invention, the tubular member 163 serves the same purpose as the member 140 of the embodiment of FIGS. 8 and 9 and the enlarged forward sleeve end 81 of the embodiment of FIGS. 1-4. However, the tubular member 163 always remains in position within the receptacle. The optical fiber termination assemblies are removable from the plug 147 and receptacle 148 by loosening the retention nuts 177 and 179. This arrangement has the added advantage of permitting both of the optical fiber termination assemblies to be identical.

Normal separation of the connector 144 is accomplished by loosening the coupling 172 to allow the plug 147 to be removed from the receptacle 148. As this occurs, the forward part 121 of the fiber termination assembly 112 in the plug slides out of the tubular member 163. The fiber termination assembly 112 of the receptacle, however, remains within the rearward end of the tubular member 163.

The foregoing detailed description is to be clearly understood as given by way of illustration and example only, the spirit and scope of this invention being limited solely by the appended claims.

What is claimed is:

1. An optical fiber connector comprising
    a first unit having a hollow interior, a forward end portion and a rearward end portion,
    a first optical fiber having an uncovered forward end received in said forward end of said first unit and a rearward covered portion received in said rearward end portion of said first unit,
        said rearward end portion of said first unit being crimped onto said covered portion of said first optical fiber for retaining the same,
    a first spherical lens of predetermined index of refraction received in said forward end portion of said first unit with a press fit for thereby retaining said first spherical lens in said first unit,
    a first flat disc of transparent material of predetermined index of refraction in said forward end portion of said first unit and engaging the rearward end of said first spherical lens, and at least one first guide member in said first unit engaging said first disc on the side thereof opposite from said first spherical lens, said first guide member being received in said forward portion of said first unit with a press fit for thereby retaining said first guide member in said first unit, said first guide member having an axial opening therethrough aligned with the center of said first spherical lens, said forward end of said first optical fiber extending through said opening in said first guide member and engaging said first disc, a second unit having a hollow interior, a forward end portion and a rearward end portion, a second optical fiber having an uncovered forward end received in said forward end of said second unit and a rearward covered portion received in said rearward portion of said second unit, said rearward end portion of said second unit being crimped onto said covered portion of said second optical fiber for retaining the same, a second spherical lens of predetermined index of refraction received in said forward end portion of said second unit with a press fit for thereby retaining said second spherical lens in said second unit, a second flat disc of transparent material of predetermined index of refraction in said forward portion of said second unit and engaging the rearward end of said second spherical lens, at least one second guide member in said forward portion of said second unit engaging said second disc on the side thereof opposite from said second spherical lens, said second guide member being received in said forward portion of said second unit with a press fit for thereby retaining said second guide member in said second unit, said second guide member having an axial opening therethrough aligned with the center of said second spherical lens, said forward end portion of said second optical fiber extending through said opening in said second guide member and engaging said second disc, and a tubular member engaging and coaxial with said forward end portion of said second unit, said tubular member extending around and slidably and complementarily receiving said forward end portion of said first unit for thereby aligning said first and second units and said first and second optical fibers, and positioning said first and second spherical lenses opposite from each other.

2. A device as recited in claim 1 in which said tubular member extends around and complementarily receives said forward end portion of said second unit, and is adhesively secured thereto.

3. A device as recited in claim 1 in which said tubular member extends around and complementarily and slidably receives said forward end portion of said second unit.

4. A device as recited in claim 1 in which said tubular member is integral with and an extension of said forward end portion of said second unit.

5. An optical fiber connector comprising a first member having a forward end portion, and a hollow interior defined by an interior wall, a first spherical lens of predetermined index of refraction received in said forward end portion of said first member and positioned by said interior wall thereof, a first transparent member of predetermined thickness and index of refraction received in said first member rearwardly of said first spherical lens and having a forward face engaging said first spherical lens, a first guide means in said first member rearwardly of said first transparent member and having an opening therethrough aligned with the center of said first spherical lens, a first optical fiber extending substantially complementarily through said opening in said first guide means and having a forward end engaging the rearward face of said first transparent member, a second member having a forward end portion, and a hollow interior defined by an interior wall, a second spherical lens in said forward end portion of said second member and positioned by said interior wall thereof, a second transparent member of predetermined thickness and index of refraction received in said second member rearwardly of said second spherical lens and having a forward end face engaging said second spherical lens, a second guide means in said second member rearwardly of said second transparent member and having an axial opening therethrough aligned with the center of said second spherical lens, a second optical fiber extending substantially complementarily through said opening in said second guide means and having a forward end engaging the rearward face of said second transparent member, and means for releasably interconnecting said first and second members and aligning the same so that said first and second spherical lenses are spaced opposite from each other and said first and second optical fibers are substantially aligned.

6. A device as recited in claim 5 in which said interior wall at said forward end portion of said first member is cylindrical and said first spherical lens is received in said forward end portion of said first member with a press fit for thereby holding said first spherical lens therein, and said interior wall of said forward end portion of said second member is cylindrical and said second spherical lens is received in said forward end portion of said second member with a press fit for thereby holding said second spherical lens therein.

7. A device as recited in claim 5 in which said first transparent member is a disc having a forward end face engaging said first spherical lens, and said second transparent member is a disc having a forward end face engaging said second spherical lens.

8. A device as recited in claim 5 in which at least a portion of said interior wall of said first member is cylindrical, said first guide means comprising an element having a cylindrical exterior wall intermediate the ends thereof with said exterior wall thereof engaging said cylindrical interior wall of said first member with a press fit for thereby holding said first guide means in said first member, and at least a portion of said interior wall of said second member is cylindrical, said second guide means comprising an element having a cylindrical exterior wall intermediate the ends thereof with said exterior wall thereof engaging said cylindrical interior wall of said second member with a press fit for thereby holding said second guide means in said second member.

9. An optical fiber connector comprising
a first unit, said first unit including
  a first external shoulder means,
  a first forward tubular part,
  a first spherical lens received in said first tubular part with a press fit for thereby retaining said first spherical lens in said first tubular part and centering said first spherical lens relative to the longitudinal axis of said first tubular part,
  a first fiber guide means received in said first tubular part with a press fit rearwardly of said first spherical lens for thereby retaining said first guide means in said first tubular part, said first guide means having an opening aligned with the center of said first spherical lens,
  a first transparent disc of predetermined index of refraction and predetermined thickness in said first forward tubular part interposed between said first spherical lens and said first guide means,
    one end of said first disc at its center engaging said first spherical lens, leaving a space between remaining portions of said first disc and said first spherical lens, and the other end of said first disc engaging one end of said first guide means,
  and an optical indexing fluid occupying said space,
  a first optical fiber extending into said first unit,
    said first optical fiber being received in said opening in said first guide means and having an end abutting said first disc whereby said first optical fiber is aligned with the center of said first spherical lens and said end of said first fiber is spaced a predetermined distance from said first spherical lens,
  a first connector body including means engageable with said first shoulder means for removably retaining said first unit,
a second unit, said second unit including
  a second external shoulder means,
  a second forward tubular part,
  a second spherical lens received in said second tubular part with a press fit for thereby retaining said second spherical lens in said second tubular part and centering said second spherical lens relative to the longitudinal axis of said second tubular part,
  a second fiber guide means received in said second tubular part with a press fit rearwardly of said second spherical lens for thereby retaining said second guide means in said second tubular part, said second guide means having an opening aligned with the center of said second spherical lens,
  a second transparent disc of predetermined thickness and predetermined index of refraction in said second forward tubular part interposed between said second spherical lens and said second guide means,
    one end of said second disc at its center engaging said second spherical lens, leaving a space between remaining portions of said second disc and said second spherical lens, and the other end of said second disc engaging said second guide means,
  and an optical indexing fluid occupying said space,
  a second optical fiber extending into said second unit,
    said second optical fiber being received in said opening in said second guide means and having an end abutting said second disc, whereby said second optical fiber is aligned with the center of said second spherical lens and said end of said second optical fiber is spaced a predetermined distance from said second spherical lens,
  a second connector body including means engageable with said second shoulder means for removably retaining said second unit,
a sleeve engaging and coaxial with said first tubular part, said sleeve extending around and slidably and complementarily receiving said second tubular part for thereby aligning said first and said second tubular parts, and positioning said first and said second spherical lenses opposite from each other,
and means for detachably interconnecting said first and said second connector bodies.

10. A device as recited in claim 9 in which
said first fiber guide means has an opposite end having a recess therein communicating with said opening in said first guide means,
said second fiber guide means has an opposite end having a recess therein communicating with said opening in said second guide means,
and including an optical indexing fluid in said recess in said first guide means and in said recess in said second guide means,
  whereby said end of said first optical fiber is wetted by said optical fluid when said first optical fiber is so received in said opening in said first guide means, and said end of said second optical fiber is wetted by said optical fluid when said second optical fiber is so received in said opening in said second guide means.

11. An optical fiber connector comprising
a first tubular member having a forward end and a cylindrical interior wall,
a first spherical lens of predetermined index of refraction received with a press fit in said first tubular member adjacent said forward end thereof and positioned by said interior wall thereof so that the center of said first spherical lens is on the longitudinal axis of said first tubular member,
a first transparent disc of predetermined thickness and index of refraction received in said first tubular member rearwardly of said first spherical lens and having a forward face engaging said first spherical lens,
a first guide member having a cylindrical exterior surface and an axial opening therethrough,
  said first guide member being received with a press fit in said first tubular member rearwardly of said first disc and positioned by said interior wall of said first tubular member so that said axial opening of said first guide member is coaxial with said interior wall of said first tubular member,
  said first guide member having a forward face engaging the rearward face of said first transparent disc,
a first optical fiber extending substantially complementarily through said opening in said first guide member and having a forward end engaging said rearward face of said first transparent disc,
a second tubular member having a forward end, and a hollow cylindrical interior wall, a second spherical lens of predetermined index of refraction received with a press fit in said second tubular member adjacent said forward end thereof and positioned by said interior wall thereof so that the center of said second spherical lens is on the longitudinal axis of said second tubular member, a second transparent disc of predetermined thickness and index of refraction received in said second tubular member rearwardly of said second spherical lens and having a forward face engaging said second spherical lens, a second guide member having a cylindrical exterior surface and an axial opening therethrough, said second guide member being received with a press fit in said second tubular member rearwardly of said second transparent disc and positioned by said interior wall of said second tubular member so that said axial opening of said second guide member is coaxial with said interior wall of said second tubular member, said second guide member having a forward face engaging the rearward face of said second transparent disc, a second optical fiber extending substantially complementarily through said opening in said second guide member and having a forward end engaging said rearward face of said second transparent disc, and means for releasably interconnecting said first and second tubular members and aligning the same so that said first and second spherical lenses are spaced opposite from each other and said first and second optical fibers are substantially aligned.

12. The method of constructing an optical fiber connector part comprising the steps of forming a cylindrical opening in a body, forming in a guide member an axial opening substantially complementary to an optical fiber to be connected, forming a cylindrical exterior surface on said guide member dimensioned to make a press fit in said cylindrical opening, forming a spherical lens of predetermined index of refraction with a diameter such that said spherical lens is dimensioned to make a press fit in said cylindrical opening, forming a disc of transparent material of predetermined index of refraction with a predetermined thickness and an exterior periphery dimensioned to fit within said cylindrical opening, then introducing said spherical lens, guide member and disc into said cylindrical opening by positioning said disc in said cylindrical opening, and pressing said spherical lens into said cylindrical opening from one end thereof to a predetermined position axially of said cylindrical opening and pressing said guide member into said cylindrical opening from the opposite end thereof to a predetermined position axially of said cylindrical opening with said disc between said spherical lens and said guide member and engaged thereby, and then extending such an optical fiber through said axial opening in said guide member and engaging said disc with the end of said optical fiber.

13. The method as recited in claim 12 in which in so introducing said spherical lens, guide member and disc into said cylindrical opening, said guide member is so pressed into said cylindrical opening, then said disc is introduced into said cylindrical opening from said one end, and then said spherical lens is so pressed into said cylindrical opening.

14. The method as recited in claim 13 in which said exterior periphery of said disc is formed to a dimension such that said disc does not fit tightly within said cylindrical opening.

15. The method as recited in claim 13 in which in so pressing said spherical lens into said opening said spherical lens is pressed inwardly of said opening to the point of engagement with said disc and said disc acts as an abutment for said spherical lens.

* * * * *